Sept. 25, 1923.　　　　A. H. McCOMISKEY, JR　　　　1,469,094
ELECTRIC GYROSTAT
Filed Oct. 24, 1921　　3 Sheets-Sheet 2

Inventor
Alexander H. M<sup>c</sup>Comiskey, Jr.

By
J. H. Cook
Attorney

Sept. 25, 1923.

A. H. McCOMISKEY, JR 1,469,094

ELECTRIC GYROSTAT

Filed Oct. 24, 1921   3 Sheets-Sheet 3

Inventor
*Alexander H. M<sup>c</sup>Comiskey, J<sup>r</sup>*

By  *J. H. Cook*
   Attorney

Patented Sept. 25, 1923.

1,469,094

UNITED STATES PATENT OFFICE.

ALEXANDER H. McCOMISKEY, JR., OF NEW ORLEANS, LOUISIANA.

ELECTRIC GYROSTAT.

Application filed October 24, 1921. Serial No. 509,876.

*To all whom it may concern:*

Be it known that I, ALEXANDER H. McCOMISKEY, Jr., a citizen of the United States, residing at New Orleans, in the parish of Orleans, State of Louisiana, have invented certain new and useful Improvements in Electric Gyrostats, of which the following is a specification.

This invention relates to gyro motors and more particularly to that class of gyrostats operating with an electrically rotated fly wheel.

One of the objects of the invention is to provide an electric motor mounted as a whole upon trunnions arranged in a line perpendicular to the axis of rotation of the armature of said motor.

Another object of the invention is the construction of an electric motor the armature of which rotates about a shaft fixed relative to a frame, said frame being oscillatably mounted upon trunnions which are arranged in a line perpendicular to the axis of rotation of the armature of said motor.

Another object of the invention is the provision of a gyrostat the rotor of which comprises a fixed central field and a rotatable armature surrounding the same, the latter being made massive to serve as a flywheel of the gyrostat.

Another object of the invention is to provide a gyrostat, the rotor of which comprises the armature of a motor rotatable about a fixed shaft to which is secured the field of said motor, the current for energizing said motor being led through a conduit running longitudinally through said fixed shaft.

A further object of the invention is the arrangement and organization of the parts of the armature of said motor so that they will not yield to the disruptive strains imposed upon them by the high velocity of rotation at which said armature is operated.

Still another object of the invention is to construct means for effectually cooling the rotor of said gyrostat.

With the above and other objects in view, my invention consists in the improved electric gyrostat illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1:
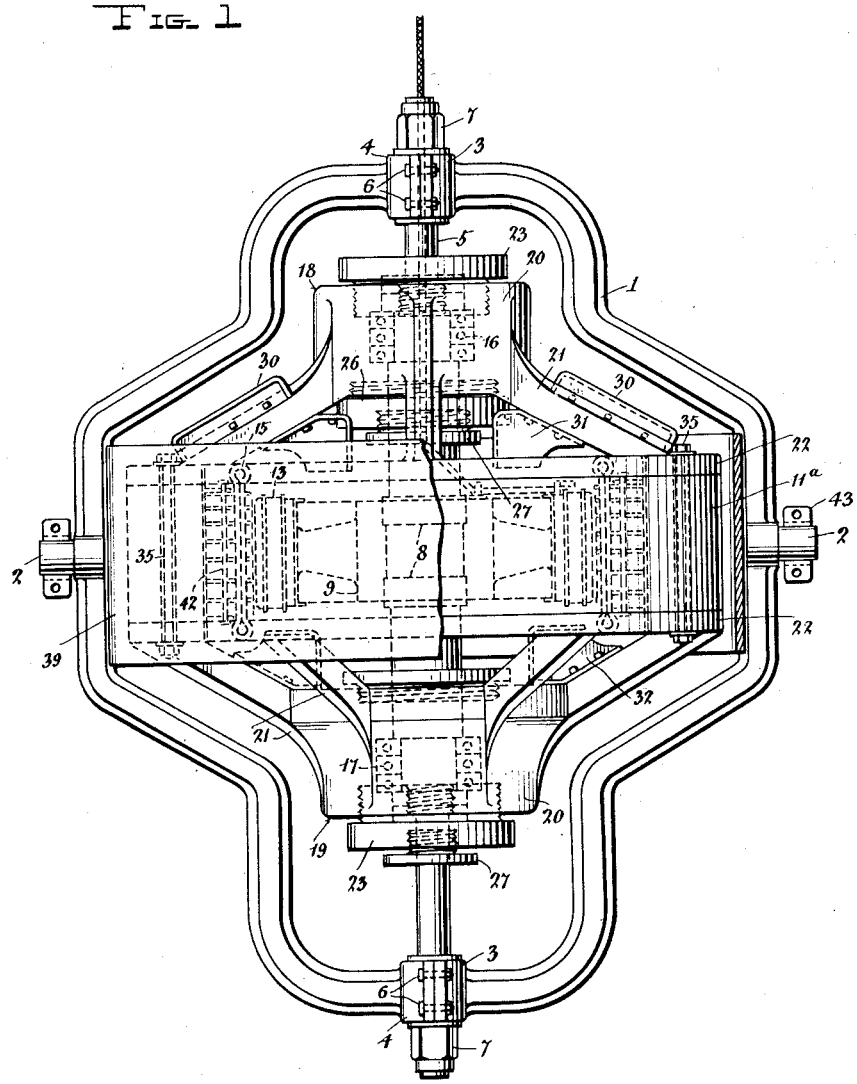
Figure 1 is a view in elevation of my improved gyro motor.
Figure 2:
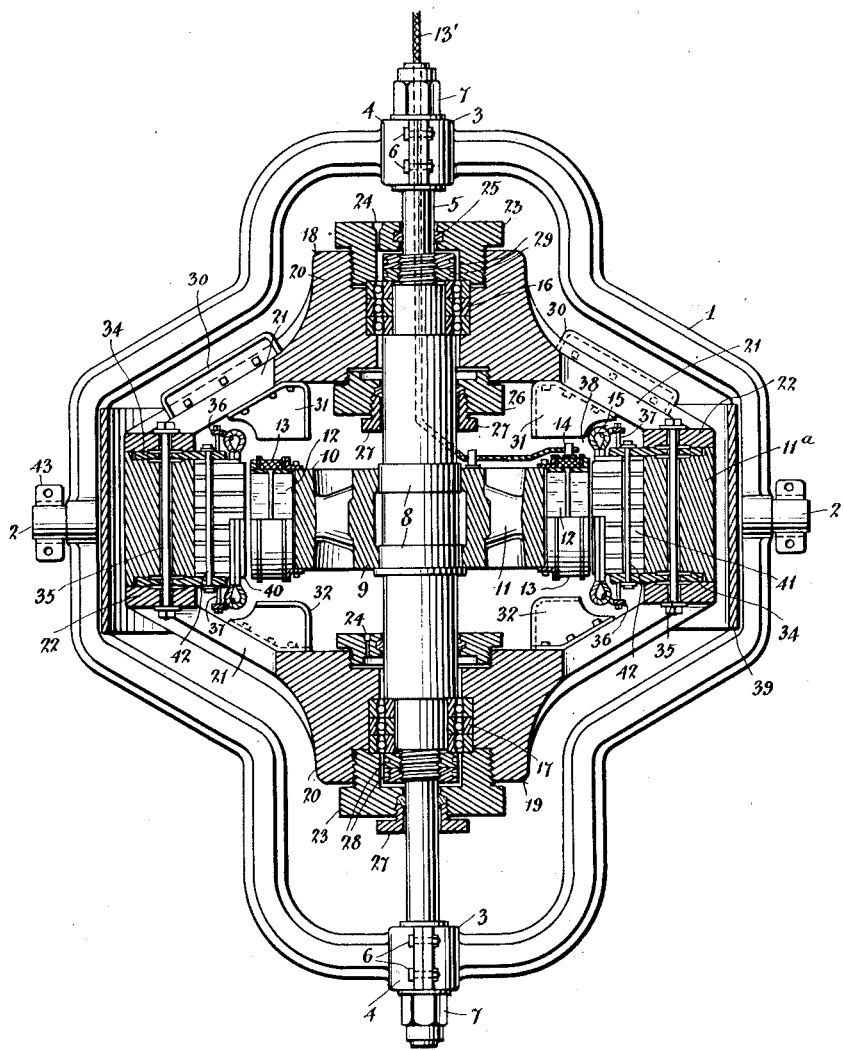
Figure 2 is a similar view showing the rotor of said gyrostat in section.
Figure 3:
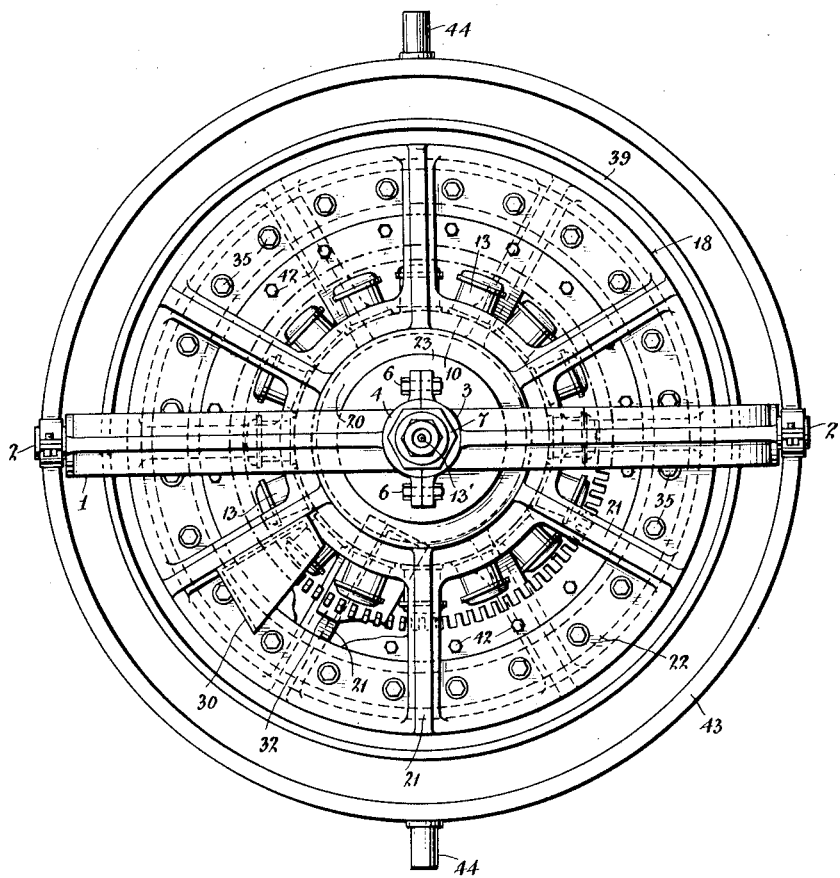
Figure 3 is a plan view of the gyro motor certain parts being omitted in order to show the enclosed structure.

In the drawings the numeral 1 represents the frame of the gyrostat which is made in two parts and supported at its opposite sides upon the trunnions 2 which are adapted to rest in bearings so that said frame is free to oscillate axially of said trunnions. Said bearings are carried at diametrically opposite points on the ring 43, which is swingably mounted by trunnions 44, arranged at right angles to said bearings and supported in bearings on a stationary base, not shown. Said frame is divided longitudinally above and below into symmetrical halves provided at their ends with registering half sockets 3 and 4 respectively embracing the fixed shaft 5 and bolted together in clamping engagement therewith by the bolts 6. The shaft 5 is threaded at each end for the reception of lock nuts 7 which bear externally upon the frame members holding said shaft securely against displacement.

Midway between its ends the shaft 5 is provided with spaced collars 8 having fixedly secured thereto the field casting 9 comprising a hub portion and an annular portion 10 concentric therewith and spaced apart by means of the integral webs 11. The external surface of the ring 10 is dovetailed at regular intervals for the reception of laminated pole pieces 12 which carry the field windings 13 of the electric motor.

Current is fed to the field windings through the insulated conductor 13' which extends through a bore running longitudinally within the upper part of the shaft 5. After passing through the field windings the current is led from the brush 14 to the commutator 15 from which it passes through the windings of the armature, back to a brush, not shown, on the stator and outwardly through another conductor in the longitudinal bore of said shaft.

At an intermediate portion on both sides of the field casting the shaft 5 is reduced in diameter forming shoulders which serve as abutments for the end thrust bearings 16 and 17. Journaled in these bearings is the rotor of the gyrostat which carries as a part thereof the armature of the motor.

The rotor comprises oppositely facing spiders 18 and 19 each of which consists of a hub portion 20, spaced arms 21 and an annular base ring 22. Each hub portion 20 is bored to form a seat cooperating with the shoulders on said shaft to provide an annular recess for the complementary parts of the end thrust bearing 16 and counterbored to retain the threaded gland 23 by which said spiders are held in place relative to said end thrust bearings. The one of said glands 23 which is designed to be uppermost in the normal position of the gyrostat is apertured as at 24 in alignment with the end thrust bearing over which it extends, forming a passage through which said bearing may be oiled. Said gland 23 is also recessed at 25 to provide an annular groove in which is retained a felt packing surrounding the shaft 5 in a manner to exclude dust from said end thrust bearings. The hub portion of the spider 18 is counterbored on its inner surface to receive the threaded gland 26 which carries the stuffing box 27 surrounding the shaft 5 and preventing the escape of oil from the end thrust bearing. The hub portion of the lower spider 19 is similarly formed except that in this case the gland engaging the interior surface of said hub is uppermost and therefore provided with the oil aperture 27 while the gland 23 carries the stuffing box. The end thrust bearings are secured to said shaft by the double lock nuts 28 and 29 which are screwed down against them.

Between the annular base rings 22 of said upper and lower spider members is secured the massive ring 11 which is preferably made of magnetic material. The arms of said upper and lower spider members are staggered with relation to one another so as to minimize the length of the unsupported span of said massive ring 11 in order to avoid elastic deformation and undue strains to which the parts would otherwise be subjected by the high velocity of rotation of said ring. To the arms of the upper spider members are secured funnel shaped vanes 30 open in the direction of the rotation of said rotor and adapted to deflect air into the space within said spiders. Fastened to the inner surface of the arms of the upper spider are air deflector plates 31 which assist directing the incoming air against the windings of the field and armature of the motor. To the inner surface of the arms of the lower spider are vanes 32 the function of which is to deflect the heated air out of and away from the interior of said spiders.

Attached at intervals around the inner surface of said ring 11 are the armature coils 40 arranged in operative relation to the pole pieces 12 of the field windings 13. These armature coils are wound on the projecting ends of a notched laminated annular core piece 41 which is secured to said ring 11 by being held between reinforcing plates 34 by bolts 42 passing through said plates and through an aperture in said laminated core pieces. The other ends of said reinforcing plates 34 lie in recesses formed between the ring 11 and the adjacent surface of the base rings 22 of said spider members. Said ring, reinforcing plates and base rings are provided with aligning apertures through which passes a single bolt 35 by which said members are rigidly tied together. The ends of the windings of said armature coils are brought out into loops at the top and bottom of each coil which loops are braced against displacement by a supporting ring 36 passing through the eye of each loop and held to a post 37 carried rigidly with said reinforcing plates 34. The upper ends of each of said loops is connected in circuit with a bar carried on an annular commutator ring 38 adapted to be swept by the brush 14 upon rotation of said armature.

Secured to the middle portion of the frame 1 is a guard ring 39 which has a width substantially greater than that of the armature and is for the purpose of protecting the rapidly rotating parts which it surrounds.

The operation of the device is readily appreciated. It is intended as the actuating means for a gryo-compass stabilizer, course director or any other type of gyrostatically controlled instrumentalities. It consists essentially of an electric motor mounted to have three degrees of freedom, one in the plane of the rotation of the armature the other in planes perpendicular thereto and at right angles to one another.

The motor shown is a series wound machine although it is apparent that any other type of winding might be used without departing from the spirit of the invention.

The armature being rotatable on the outside of the field makes it possible to combine in one structure both the impelling means and the gyro fly-wheel which has heretofore required the cooperation of two independent devices.

By leading the current longitudinally through the fixed shaft, the need for a rotary switch is obviated since the shaft is subject only to the slow oscillation due to precession of the gyrostat.

The parts are constructed and arranged to withstand the disruptive effects of centrifugal force due to the high velocity of around 20,000 revolutions per minute at which the gyromotor usually operates, and the cooling vanes on the rotating spiders are an important feature of the invention since it is through the agency of these elements that the temperature is kept down to a maximum that makes possible the continuous operation of the motor at this high speed.

It will be understood that various changes may be made in the form and relation of parts to suit different requirements of use, and that the invention, therefore, is not limited to the precise details of construction and arrangement shown.

Having described my invention what I claim as new and desire to secure by Letters Patent, is:—

1. In a gyrostat, a frame oscillatably mounted, a shaft fixedly secured to said frame in a plane perpendicular to its axis of oscillation, the divided parts of said frame being each provided at their ends with complementary half sockets, a shaft, means for clamping said shaft at its opposite ends within said half sockets and an electrically operated fly-wheel for said gyrostat journalled on said shaft.

2. In a gyrostat, a frame oscillatably mounted, said frame being divided in a plane perpendicular to its axis of oscillation, the divided parts of said frame being each provided at their ends with complementary half sockets, a shaft, means for clamping said shaft at its opposite ends within said half sockets, a motor carried by said shaft embracing a field element on said shaft and an armature journalled on said shaft and surrounding said field element, said armature acting as the fly-wheel of said gyrostat.

3. In a gyrostat, an oscillatably mounted frame, a shaft fixed to said frame in a plane perpendicular to the axis of oscillation of said frame, an electrically operated rotor for said gyrostat comprising a pair of oppositely arranged spiders having annular bases, journalled upon said shaft, a massive ring supported between said spiders and having recesses in the faces abutting said spiders, an armature carried by said ring adjacent the inner face of said ring, reinforcing plates secured to said armature extending into said recesses, there being aligning apertures through said spiders, ring and reinforcing plates, and a bolt passing through said apertures and securing said parts together.

4. In a gyrostat, a frame oscillatably mounted, a shaft fixedly secured to said frame in a plane perpendicular to its axis of rotation, a rotor journalled on said shaft comprising oppositely spaced spiders each provided with base rings, an annular massive element supported between said base rings and said spiders, the joints between said base rings and massive element lying in planes parallel to the plane of rotation of said rotor and an armature mounted adjacent the inner side of said annular massive element and clamped within the joints between said base rings and massive element.

5. In a gyrostat, a frame oscillatably mounted, a shaft fixedly secured in said frame in a plane perpendicular to its axis of oscillation, a rotor journalled on said shaft comprising a frame having hubbed end portions and a massive annular element arranged centrally thereof, said hubbed portions and annular element being connected by spaced arms, said arms being arranged in staggered relation, air deflecting vanes secured to said arms, and an armature carried by said annular element adjacent the inner surface thereof.

6. In a gyrostat, a frame oscillatably mounted, a shaft fixedly secured in said frame in a plane perpendicular to its axis of oscillation, a rotor comprising a frame having hubbed spiders journalled on said shaft and a massive annular element supported between said spiders, an annular laminated armature arranged inwardly of said massive annular element, plates arranged above and below said armature and extending into recesses between said massive annular element and said spiders, aligning apertures in said spiders, massive annular element and plates, a bolt passing through said apertures and securing said several parts together, the windings of said armature being brought out into loops above and below said armature, means secured on said plates for supporting said loops and a bolt passing through said securing means, plates and laminated armature for holding said members together.

7. In a gyrostat, a frame oscillatably mounted, a shaft fixedly secured in said frame in a plane perpendicular to its axis of oscillation, a rotor comprising hubbed spiders journalled on said shaft, a massive annular element supported between said spiders, an armature arranged inwardly of said massive annular element, common means for securing said armature, spiders and massive annular elements together, said means lying parallel to the axis of said rotor, a field element fixed to said shaft concentric with said armature, said field element comprising a hub portion and a ring supported therefrom by webs and pole pieces secured at intervals to the outer surface of said ring in operative relation to said armature.

In testimony whereof I have hereunto set my hand in presence of two subscribing witnesses.

ALEXANDER H. McCOMISKEY, Jr.

Witnesses:
ALEXANDER H. McCOMISKEY,
EDMUND P. COOK.